United States Patent
Bremser et al.

(10) Patent No.: US 7,151,130 B2
(45) Date of Patent: Dec. 19, 2006

(54) POLYURETHANE-MODIFIED COPOLYMERS, METHOD FOR THEIR PRODUCTION AND THE USE THEREOF

(75) Inventors: Wolfgang Bremser, Münster (DE); Thomas Krüger, Eisingen (DE); Wilma Löcken, Haltern (DE); Stephan Schwarte, Emsdetten (DE); Heinz-Peter Rink, Münster (DE)

(73) Assignee: BASF Coatings AG, Munster (DE)

( * ) Notice: Subject to any disclaimer, the term of this patent is extended or adjusted under 35 U.S.C. 154(b) by 384 days.

(21) Appl. No.: 10/468,448

(22) PCT Filed: Mar. 8, 2002

(86) PCT No.: PCT/EP02/02545

§ 371 (c)(1),
(2), (4) Date: Aug. 20, 2003

(87) PCT Pub. No.: WO02/079288

PCT Pub. Date: Oct. 10, 2002

(65) Prior Publication Data

US 2004/0048976 A1    Mar. 11, 2004

(30) Foreign Application Priority Data

Mar. 29, 2001  (DE)  ................ 101 15 602

(51) Int. Cl.
| | | |
|---|---|---|
| C08J 3/00 | (2006.01) | |
| C08K 3/20 | (2006.01) | |
| C08L 75/00 | (2006.01) | |
| C08F 8/30 | (2006.01) | |
| C08F 283/04 | (2006.01) | |

(52) U.S. Cl. ............... 524/507; 524/589; 524/590; 524/591; 524/839; 524/840; 525/123; 525/455

(58) Field of Classification Search ............. 524/507, 524/590, 591, 839, 840, 589; 525/123, 455
See application file for complete search history.

(56) References Cited

U.S. PATENT DOCUMENTS

| | | | | |
|---|---|---|---|---|
| 5,691,425 | A | 11/1997 | Klein et al. ............... | 525/455 |
| 6,001,424 | A | 12/1999 | Lettmann et al. ......... | 427/407.1 |
| 6,063,861 | A | 5/2000 | Irie et al. ................. | 524/591 |
| 6,162,506 | A | 12/2000 | Lettmann et al. ........ | 427/407.1 |
| 6,372,875 | B1 | 4/2002 | Mayer et al. ............ | 528/60 |
| 6,602,972 | B1 | 8/2003 | Schwarte et al. ........ | 528/45 |
| 6,607,788 | B1 | 8/2003 | Wegner et al. .......... | 427/388.4 |
| 2003/0124357 | A1 | 7/2003 | Kagerer et al. ......... | 428/422.8 |

FOREIGN PATENT DOCUMENTS

| | | |
|---|---|---|
| CA | 2016 097 | 9/1992 |
| CA | 2181 934 | 7/1996 |
| CA | 2377 757 | 6/2000 |
| CA | 2377759 | 6/2000 |
| CA | 2377927 | 6/2000 |
| CA | 2383 937 | 9/2000 |
| CA | 2389332 | 9/2000 |
| CA | 2073 115 | 8/2002 |
| CA | 2113 964 | 9/2002 |
| DE | 197 36 535 | 1/1999 |
| DE | 199 30 067 | 1/2001 |
| EP | 0 919 579 | 11/1998 |
| WO | WO02/079308 | 10/2002 |

OTHER PUBLICATIONS

Nickolaus, et al., U.S. Appl. No. 10/250,694, filed Jul. 3, 2003.
Nickolaus, et al., U.S. Appl. No. 10/250,586, filed Jul. 2, 2003.
Machine Translation of JP10-158345, Publication Date Jun. 16, 1998, from JPO.

Primary Examiner—Patrick D. Niland

(57) ABSTRACT

Polyurethane-modified addition copolymers preparable by free-radically (co)polymerizing an olefinically unsaturated monomer (a) in an aqueous or nonaqueous medium comprising at least one reaction product (A/B) of
(A) at least one addition copolymer containing on average per molecule at least 0.1 isocyanate-reactive functional groups and preparable by free-radical copolymerization of at least
 a) at least one olefinically unsaturated monomer and
 b) at least one olefinically unsaturated monomer different than the olefinically unsaturated monomer (a1) and of the general formula I

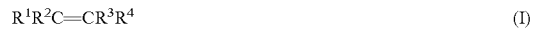
$$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;
in an aqueous medium or nonaqueous medium; and
(B) at least one polyisocyanate;
processes for preparing them, and their use.

27 Claims, No Drawings

POLYURETHANE-MODIFIED COPOLYMERS, METHOD FOR THEIR PRODUCTION AND THE USE THEREOF

FIELD OF THE INVENTION

The present invention relates to novel polyurethane-modified addition copolymers. The present invention further relates to a novel process for preparing polyurethane-modified addition copolymers. The present invention additionally relates to the use of the novel polyurethane-modified addition copolymers as coating materials, adhesives or sealing compounds or to prepare coating materials, adhesives, and sealing compounds.

BACKGROUND OF THE INVENTION

Polyurethane-modified (meth)acrylate or graft addition copolymers are known. They are normally prepared by the graft copolymerization of olefinically unsaturated monomers in the aqueous dispersion of a hydrophilic or hydrophobic polyurethane whose polymer chain includes terminal and/or lateral, olefinically unsaturated groups. Groups of this kind may be incorporated

- into the polyurethane chain by way of maleic acid or fumaric acid and/or their esters,
- laterally to the polyurethane chain by way of compounds having two isocyanate-reactive groups and at least one olefinically unsaturated group or by way of compounds having two isocyanate groups and at least one olefinically unsaturated group,
- terminally to the polyurethane chain by way of compounds having one isocyanate-reactive group and at least one olefinically unsaturated group or by way of compounds having one isocyanate group and at least one olefinically unsaturated group, or
- by way of anhydrides of alpha,beta-unsaturated carboxylic acids.

By way of example, reference is made to the patent applications and patents DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1 and EP 0 730 613 A1, and also to the German patent applications DE 199 53 446.2, DE 199 53 445.2, and DE 199 53 203.6, unpublished at the priority date of the present specification.

In the context of the present invention, the property of hydrophilicity denotes the constitutional property of a molecule or functional group to penetrate into the aqueous phase or to remain therein. Accordingly, in the context of the present invention, the property of hydrophobicity denotes the constitutional property of a molecule or functional group to behave exophilically with respect to water, i.e., to tend not to penetrate into water or to tend to depart the aqueous phase. For further details, reference is made to Römpp Lexikon Lacke und Druckfarben, Georg Thieme Verlag, Stuttgart, New York, 1998, "hydrophilicity", "hydrophobicity", pages 294 and 295.

The known polyurethane-based graft copolymers are used especially for the preparation of aqueous basecoat materials. The known aqueous basecoat materials serve primarily to produce color and/or effect basecoats in multicoat coating systems by the wet-on-wet technique, as are described, for example, in the patents and patent applications recited above.

Nevertheless, the preparation of the known polyurethane-based graft copolymers may cause problems.

For instance, lateral and/or terminal allyl groups are often incorporated as grafting centers. However, the reactivity of the allyl groups is comparatively low. If the more reactive acrylate or methacrylate groups are used instead, gelling of the polyurethanes may occur before or during the graft copolymerization.

In some cases it is possible, not least, for the amount of olefinically unsaturated groups in the polyurethanes to prove too low for complete grafting, with the consequence that a large proportion of the monomers intended for grafting on forms separate homopolymers and/or copolymers alongside the polyurethane, which may adversely affect the performance properties of the graft copolymers and of the coating materials, adhesives, and sealing compounds prepared with them. This disadvantage cannot be easily eliminated by raising the double-bond fraction in the polyurethanes to be grafted, since to do so is detrimental to other important performance properties of the polyurethanes.

A further key disadvantage associated with the preparation of the known graft copolymers based on polyurethane is that the free-radical copolymerization employed to prepare the (meth)acrylate copolymers is frequently very exothermic and difficult to control. For the reaction regime this means that it is necessary to avoid high concentrations of monomers and/or the batch procedure, where the entirety of the monomers are introduced in an aqueous medium, emulsified and then polymerized to completion. The purposive establishment of defined molecular weights, molecular weight distributions, and other properties also frequently causes difficulties. The purposive adjustment of a defined profile of properties of the (meth)acrylate copolymers is, however, of great importance for their use as binders in coating materials, adhesives, and sealing compounds, since it provides a means of directly influencing the profile of performance properties of the coating materials, adhesives, and sealing compounds and of the coatings, adhesive films, and seals produced from them.

The German patent application 100 17 653.4, unpublished at the priority date of the present specification, describes polyurethane-based graft copolymers preparable by subjecting at least one hydrophobic or hydrophilic polyurethane containing on average at least one thiol group to graft copolymerization with at least one olefinically unsaturated monomer in solution or in an aqueous dispersion.

The German patent application 100 53 890.8, unpublished at the priority date of the present specification, describes polyurethanes containing sulfide groups, which are used to prepare polymer mixtures or graft copolymers. In this case, at least one olefinically unsaturated monomer as well is subjected to graft copolymerization.

In both cases, diphenylethylene may be used as a comonomer. However, this comonomer is not used to prepare a polyurethane in whose presence further olefinically unsaturated monomers are copolymerized.

The use of (meth)acrylate copolymers preparable by single-stage or multistage free-radical copolymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;

as binders in basecoat materials, especially aqueous basecoat materials (cf. the German patent application DE 199 30 665 A1), primer-surfacers, and antistonechip primers (cf. the German patent application DE 199 30 067 A1), and clearcoat materials (cf. the German patent application DE 199 30 664 A1) is known. These known copolymers, however, are not modified with polyurethanes.

SUMMARY OF THE INVENTION

It is an object of the present invention to find novel, polyurethane-modified copolymers which no longer have the disadvantages of the prior art but which instead can be prepared simply, controlledly and purposively in high yields, so that purposive chemical structuring of the novel, polyurethane-modified copolymers is possible. The novel, polyurethane-modified copolymers should be suitable for preparing novel coating materials, adhesives, and sealing compounds, especially novel aqueous coating materials, adhesives, and sealing compounds, which on and in primed and unprimed substrates provide novel coatings, adhesive films, and seals having an outstanding profile of performance properties. The novel coatings should exhibit very good adhesion to the substrates, a particularly smooth, defect-free surface, an outstanding overall appearance, especially with regard to color, effect, and gloss, high chemical resistance, weathering stability, acid stability, water resistance, and scratch resistance. The novel adhesive films should provide long-term bonding of a very wide variety of substrates to one another and should possess high chemical and mechanical stability even under extreme temperatures and/or temperature fluctuations. Similarly, the novel seals should provide long-term sealing of the substrates, and ought also to possess high chemical and mechanical stability, even under extreme temperatures and/or temperature fluctuations in conjunction with exposure to aggressive chemicals.

The invention accordingly provides the novel, polyurethane-modified addition copolymers preparable by free-radically (co)polymerizing at least one olefinically unsaturated monomer (a) in an aqueous or nonaqueous medium comprising the reaction product (A/B) of (A) at least one addition copolymer containing on average per molecule at least 0.1 isocyanate-reactive functional groups and preparable by free-radical copolymerization of at least
  a) at least one olefinically unsaturated monomer and
  b) at least one olefinically unsaturated monomer different than the olefinically unsaturated monomer (a) and of the general formula I $$R^1R^2C\!=\!CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;

in an aqueous medium or nonaqueous medium; and (B) at least one polyisocyanate.

In the text below, the novel, polyurethane-modified addition copolymers are referred to as the "modified copolymers of the invention".

The invention further provides the novel process for preparing polyurethane-modified addition copolymers, which involves (I) preparing in an aqueous or nonaqueous medium at least one addition copolymer (A) containing on average per molecule at least 0.1 isocyanate-reactive functional groups by free-radical copolymerization of at least
  a) at least one olefinically unsaturated monomer and
  b) at least one olefinically unsaturated monomer different than the olefinically unsaturated monomer (a) and of the general formula I $$R^1R^2C\!=\!CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals;

(II) reacting the resulting copolymer (A) with at least one polyisocyanate (B) to give the polyurethane (A/B), and (III) (co)polymerizing at least one further olefinically unsaturated monomer (a) in the presence of the polyurethane (A/B).

In the text below, the novel process for preparing polyurethane-modified addition copolymers is referred to as the "process of the invention".

Further subject matter of the invention will emerge from the description.

DETAILED DESCRIPTION OF THE PREFERRED EMBODIMENTS

The modified copolymers of the invention may be prepared by any of a very wide variety of methods of organic polymer chemistry, especially those of the chemistry of polyurethanes and of addition copolymers. In accordance with the invention it is of advantage if the process of the invention is employed.

The process of the invention starts from the preparation of at least one addition copolymer (A) containing on average per molecule at least 0.1, preferably at least 0.15, more preferably at least 0.2, with particular preference at least 0.25, with very particular preference at least 0.3, and in particular 0.4 isocyanate-reactive functional groups.

Examples of suitable isocyanate-reactive functional groups are thiol, hydroxyl, and primary and secondary amino groups, especially hydroxyl groups.

The copolymer (A) is preparable by free-radical copolymerization of at least one olefinically unsaturated monomer (a) and at least one olefinically unsaturated monomer (b) different than the olefinically unsaturated monomer (a).

Monomers (b) used are compounds of the general formula I.

In the general formula I, the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tertbutyl, amyl, hexyl and 2-ethylhexyl.

Examples of suitable cycloalkyl radicals are cyclobutyl, cyclopentyl, and cyclohexyl.

Examples of suitable alkylcycloalkyl radicals are methylenecyclohexane, ethylenecyclohexane, and propane-1,3-diylcyclohexane.

Examples of suitable cycloalkylalkyl radicals are 2-, 3-, and 4-methyl-, -ethyl-, -propyl-, and -butylcyclohex-1-yl.

Examples of suitable aryl radicals are phenyl, naphthyl, and biphenylyl.

Examples of suitable alkylaryl radicals are benzyl and ethylene- and propane-1,3-diylbenzyl.

Examples of suitable cycloalkylaryl radicals are 2-, 3-, and 4-phenylcyclohex-1-yl.

Examples of suitable arylalkyl radicals are 2-, 3-, and 4-methyl-, -ethyl-, -propyl-, and -butylphen-1-yl.

Examples of suitable arylcycloalkyl radicals are 2-, 3-, and 4-cyclohexylphen-1-yl.

The above-described radicals $R^1$, $R^2$, $R^3$, and $R^4$ may be substituted. For this purpose it is possible to use electron withdrawing or electron donating atoms or organic radicals, which are preferably not isocyanate-reactive.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl, and arylcycloalkyl radicals, including those exemplified above, especially tert-butyl; aryloxy, alkyloxy, and cycloalkyloxy radicals, especially phenoxy, naphthoxy, methoxy, ethoxy, propoxy, butyloxy or cyclohexyloxy; arylthio, alkylthio, and cycloalkylthio radicals, especially phenylthio, naphthylthio, methylthio, ethylthio, propylthio, butylthio or cyclohexylthio; and tertiary amino groups, especially N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers (a2) whose use is particularly preferred in accordance with the invention are diphenylethylene, dinaphthaleneethylene, cis- and trans-stilbene, vinylidenebis(4-N,N-dimethylamino-benzene), vinylidenebis(4-aminobenzene), and vinylidenebis(4-nitrobenzene).

In accordance with the invention, the monomers (b) may be used individually or as a mixture of at least two monomers (b).

With regard to the reaction regime and the properties of the resulting copolymers (A), of the polyurethanes (A/B) prepared from them, and of the modified addition copolymers of the invention, diphenylethylene is of very particular advantage and is therefore used with very particular preference.

Suitable olefinically unsaturated monomers (a) include in principle all monomers as commonly used in the field of polymer chemistry. The monomers (a) may be classified as follows:
  monomers (a1) which serve to introduce hydrophilic functional groups into the copolymers (A);
  monomers (a2) which serve to introduce isocyanate-reactive functional groups into the copolymers (A); and
  monomers (a3) which either contain no functional groups or contain functional groups which are not isocyanate-reactive.

The incorporation of the above-described isocyanate-reactive functional groups into the copolymers (A) may, however, also take place after the copolymerization, by means of polymer-analogous reactions. One example of such a polymer-analogous reaction is the reaction of pendant (lateral) or end-positioned (terminal) epoxide groups with carboxylic acids, in which ester groups and hydroxyl groups are formed.

Preferably, however, the isocyanate-reactive functional groups are introduced into the copolymers (A) by the copolymerization of olefinically unsaturated monomers (a2), which contain on average per molecule at least one, especially one, isocyanate-reactive functional group, and/or by way of at least one compound (c), which contains on average per molecule at least one, especially one, thiol group and at least one, especially one, further isocyanate-reactive functional group different than the thiol group.

The monomer (a1) contains at least one, preferably one, functional, preferably non-isocyanate-reactive group selected from the group consisting of
(a11) functional groups convertible into cations by neutralizing agents and/or quaternizing agents, and cationic groups,
(a12) functional groups convertible into anions by neutralizing agents, and anionic groups, and
(a13) nonionic hydrophilic groups.

In the selection of the functional groups care should be taken to ensure that no functional groups (a11) are combined with functional groups (a12), since this may lead to the formation of insoluble polyelectrolyte complexes.

Preferably, the functional groups (a11) are selected from the group consisting of carboxylic acid, sulfonic acid, and phosphonic acid groups, acidic sulfuric and phosphoric ester groups, and carboxylate, sulfonate, phosphonate, sulfate ester, and phosphate ester groups, especially carboxylic acid and carboxylate groups, the functional groups (a12) are selected from the group consisting of tertiary amino groups and tertiary and quaternary ammonium groups, quaternary phosphonium groups, and tertiary sulfonium groups, especially tertiary amino groups and tertiary and quaternary ammonium groups, and the functional groups (a13) are selected from the group consisting of omega-hydroxy- and omega-alkoxy-poly(alkylene oxide)-1-yl groups, preferably omega-hydroxy- and omega-methoxy-, omega-ethoxy-, omega-propyloxy- and omega-butoxy-poly(ethylene oxide)-, -poly(propylene oxide)-, -poly(butylene oxide)-, and -poly(ethylene oxide-copropylene oxide)-1-yl groups, preferably with a degree of polymerization of from 5 to 100, in particular from 5 to 50.

The neutralizing agents for the functional groups (a11) convertible into cations are preferably selected from the group consisting of sulfuric acid, hydrochloric acid, phosphoric acid, formic acid, acetic acid, lactic acid, dimethylolpropionic acid, and citric acid, and the neutralizing agents for the functional groups (a12) convertible into anions are selected from the group consisting of ammonia, hydrazine, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine, triethanolamine, diethylenetriamine, and triethylenetetramine.

Particular preference is given to using carboxylic acid groups and carboxylate groups (a11) and also the corresponding neutralizing agents.

Examples of suitable hydrophilic olefinically unsaturated monomers (a1) are alpha,beta-olefinically unsaturated carboxylic acids, such as acrylic acid, methacrylic acid, ethacrylic acid, crotonic acid, maleic acid, fumaric acid, and itaconic acid, mono(meth)acryloyloxyethyl maleate, mono (meth)acryloyloxyethyl succinate, and mono(meth)acryloyloxyethyl phthalate, and also vinylbenzoic acid (all isomers) and alpha-methylvinylbenzoic acid (all isomers), which may be used individually or as a mixture of at least two monomers (a1). It is preferred to use acrylic acid and/or methacrylic acid.

Examples of suitable olefinically unsaturated monomers (a2) are hydroxyalkyl esters of alpha,beta-olefinically unsaturated carboxylic acids, such as hydroxyalkyl esters of acrylic acid, methacrylic acid, and ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl) cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, and these hydroxyalkyl esters;

olefinically unsaturated alcohols such as allyl alcohol;

allyl ethers of polyols such as trimethylolpropane monoallyl or diallyl ether or pentaerythritol monoallyl, diallyl or triallyl ether. These monomers of higher functionality, (a3), are generally used only in minor amounts. In the context of the present invention, minor amounts of monomers of higher functionality are those amounts which do not lead to crosslinking or gelling of the copolymers (A), unless the intention is that the modified copolymers of the invention should be in the form of crosslinked microgel particles;

reaction products of alpha-beta-olefinically unsaturated carboxylic acids with glycidyl esters of an alpha-branched monocarboxylic acid having from 5 to 18 carbon atoms per molecule. The reaction of acrylic or methacrylic acid with the glycidyl ester of a carboxylic acid having a tertiary alpha carbon atom may take place before, during or after the addition polymerization reaction. It is preferred as component (a5) to use the reaction product of acrylic and/or methacrylic acid with the glycidyl ester of Versatic® acid. This glycidyl ester is available commercially under the name Cardura® E10. For further details, reference is made to Römpp Lexikon Lacke und Druckfarben, Georg Thieme Verlag, Stuttgart, New York, 1998, pages 605 and 606;

allylamine and crotylamine;

aminoalkyl esters of alpha,beta-olefinically unsaturated carboxylic acids, such as aminoethyl acrylate, aminoethyl methacrylate or N-methyliminoethyl acrylate;

formaldehyde adducts of aminoalkyl esters of alpha,beta-olefinically unsaturated carboxylic acids and of alpha,beta-unsaturated carboxamides, such as N-methylol- and N,N-dimethylol-aminoethyl acrylate, -aminoethyl methacrylate, -acrylamide and -methacrylamide; and also olefinically unsaturated monomers containing acryloxysilane groups, preparable by reacting hydroxy-functional silanes with epichlorohydrin and then reacting the intermediate with an alpha,beta-olefinically unsaturated carboxylic acid, especially acrylic acid and methacrylic acid or their hydroxyalkyl esters.

Of these monomers (a2), the hydroxyalkyl esters, especially the 2-hydroxyethyl, 2-hydroxypropyl, 3-hydroxypropyl, 3-hydroxybutyl, and 4-hydroxybutyl esters of acrylic acid and methacrylic acid, are of advantage and are therefore used with particular preference.

Examples of suitable compounds (c) are thiols containing hydroxyl and/or primary and/or secondary amino groups, such as 2-mercaptoethanol, 3-mercaptopropanol, and 4-mercaptobutanol, especially 2-mercaptoethanol.

Examples of suitable monomers (a3) are alkyl and cycloalkyl esters of alpha,beta-olefinically unsaturated carboxylic, phosphonic and sulfonic acids, such as (meth)acrylic, crotonic, ethacrylic, vinylphosphonic or vinylsulfonic alkyl or cycloalkyl esters having up to 20 carbon atoms in the alkyl radical, especially methyl, ethyl, propyl, n-butyl, sec-butyl, tert-butyl, hexyl, ethylhexyl, stearyl, and lauryl acrylate, methacrylate, crotonate, ethacrylate or vinylphosphonate or vinylsulfonate; cycloaliphatic (meth)acrylic, crotonic, ethacrylic, vinylphosphonic or vinylsulfonic esters, especially cyclohexyl, isobornyl, dicyclopentadienyl, octahydro-4,7-methano-1H-indenemethanol or tert-butylcyclohexyl (meth)acrylate, crotonate, ethacrylate, vinylphosphonate or vinylsulfonate. These monomers may contain, in minor amounts, (meth)acrylic, crotonic or ethacrylic alkyl or cycloalkyl esters of higher functionality, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate, and also the analogous ethacrylates or crotonates. In the context of the present invention, minor amounts of monomers (a4) of higher functionality are amounts which do not lead to crosslinking or gelling of the copolymers (A), unless the intention is that the modified copolymers of the invention should be present in the form of crosslinked microgel particles;

olefins such as ethylene, propylene, but-1-ene, pent-1-ene, hex-1-ene, cyclohexene, cyclopentene, norbornene, butadiene, isoprene, cyclopentadiene and/or dicyclopentadiene;

amides of alpha,beta-olefinically unsaturated carboxylic acids, such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl- and/or N,N-cyclohexyl-methyl(meth)acrylamide;

monomers containing epoxide groups, such as the glycidyl ester of acrylic acid, methacrylic acid, ethacrylic acid, crotonic acid, maleic acid, fumaric acid and/or itaconic acid;

monomers containing carbamate or allophanate groups, such as acryloyloxy- or methacryloyloxyethyl, -propyl or -butyl carbamate or allophanate; further examples of suitable monomers containing carbamate groups are described in the patents U.S. Pat. No. 3,479,328 A1, U.S. Pat. No. 3,674,838 A1, U.S. Pat. No. 4,126,747 A1, U.S. Pat. No. 4,279,833 A1, and U.S. Pat. No. 4,340,497 A1;

vinylaromatic hydrocarbons, such as styrene, alpha-alkylstyrenes, especially alpha-methylstyrene, and vinyltoluene;

nitriles, such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are sold under the brand name VeoVa® by Deutsche Shell Chemie (for further details, refer to Römpp Lexikon Lacke und Druckfarben, Georg Thieme Verlag, Stuttgart, New York, 1998, page 598 and also pages 605 and 606) and/or the vinyl ester of 2-methyl-2-ethylheptanoic acid; and polysiloxane macromonomers which have a number average molecular weight Mn of from 1000 to 40,000, preferably from 2000 to 20,000, with particular preference from 2500 to 10,000, and in particular from 3000 to 7000, and on average per molecule from 0.5 to 2.5, preferably from 0.5 to 1.5 ethylenically unsaturated double bonds, as described in DE 38 07 571 A1, on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12, line 18 to page 18, line 10.

From the above-described suitable monomers (a) and (b) and also compounds (c), the skilled worker is readily able to select the monomers (a) and compounds (c) especially suitable for the particular end use, on the basis of their known physicochemical properties and reactivities.

For example, said skilled worker may select monomers (a2) and/or (a3) that introduce reactive functional groups suitable for thermal crosslinking, such as N-methylol, N-methoxy, carbamate, allophanate or epoxide groups.

Where the copolymers (A) and the modified copolymers of the invention prepared from them are to be dispersible or soluble in water, monomers (a1) are used in the appropriate amounts.

Where the copolymers (A) and the modified copolymers of the invention prepared from them are to be dispersible or soluble in organic solvents, small amounts of monomers (a1), if any, are used. In that case it is preferred to use monomers (a2) and/or monomers (a3) which are of low hydrophilicity, and which are preferably hydrophobic.

It is therefore a particular advantage of the present invention that the hydrophilic and hydrophobic properties of the copolymers (A) and of the modified copolymers of the invention prepared from them may be adjusted purposively and matched to the particular end uses.

Where the modified copolymers of the invention are present in the form, or comprise, crosslinked microgel particles, monomers (a) of relatively high functionality, especially the above-described monomers (a1), (a2) and/or (a3) of relatively high functionality, are employed in amounts which lead to a purposive crosslinking of the copolymers (A).

The monomers (a) are preferably selected so that the properties profile of the copolymers (A) is substantially determined by the above-described (meth)acrylate monomers (a1), (a2) and/or (a3), with the monomers (b) advantageously varying this properties profile in a broad and purposive manner. Accordingly, the particularly advantageous copolymers (A) are (meth)acrylate copolymers.

The copolymerization of the mixtures of
the monomers (a) and (b) or
the monomers (a) and (b) and the compounds (c) has no special features in terms of its method but instead takes place in accordance with the customary and known methods of free-radical solution polymerization in a nonaqueous medium, i.e., in organic solution, or of emulsion polymerization, miniemulsion polymerization or microemulsion polymerization in the presence of at least one free-radical initiator in an aqueous medium, as described, for example, in the patent applications and patents DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1, and EP 0 730 613 A1, and in the German patent applications 199 53 446.2, 199 53 445.2, and 199 53 203.6, unpublished at the priority date of the present specification.

Emulsion polymerization is employed with preference.

The aqueous medium comprises substantially water. The aqueous medium may include minor amounts of organic solvents and/or other dissolved solid, liquid or gaseous organic and/or inorganic substances of low and/or high molecular mass, especially auxiliaries such as surface-active substances, provided these do not adversely affect, let alone inhibit, the copolymerization. In the context of the present invention, the term "minor amount" means an amount which does not remove the aqueous nature of the aqueous medium. However, the aqueous medium may also comprise water alone.

The copolymerization is preferably conducted in the presence of at least one base. Particularly preferred bases are those of low molecular mass, such as sodium hydroxide solution, potassium hydroxide solution, ammonia, diethanolamine, triethanolamine, mono-, di-, and triethylamine, and/or dimethylethanolamine, especially ammonia.

Examples of free-radical initiators which can be used include the following: dialkyl peroxides, such as di-tert-butyl peroxide or dicumyl peroxide; hydroperoxides, such as cumenl hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; sodium, potassium or ammonium peroxodisulfate; azo initiators, examples being azodinitriles such as azobisisobutyronitrile; C—C-cleaving initiators such as benzpinacol silyl ethers; or a combination of a nonoxidizing initiator with hydrogen peroxide. It is also possible, furthermore, to use combinations of the initiators described above.

Further examples of suitable initiators are described in the German patent application DE 196 28 142 A1 on page 3, line 49 to page 4, line 6.

It is preferred to add comparatively large amounts of free-radical initiator, with the fraction of the initiator in the reaction mixture, based in each case on the overall amount of the monomers (a) and the initiator, being with particular preference from 0.2 to 20% by weight, with very particular preference from 0.5 to 15% by weight, and in particular from 1.0 to 10% by weight.

In the organic solutions or aqueous emulsions, the monomers (a) and (b) are then polymerized with the aid of the aforementioned, radical-forming initiators at temperatures of from 0 to 95° C., preferably from 40 to 95° C., and, when using redox systems, at temperatures of from 30 to 70° C. When operating under superatmospheric pressure, the emulsion polymerization may also be conducted at temperatures above 100° C. The same applies to solution polymerization, if relatively high-boiling organic solvents and/or superatmospheric pressure are/is employed.

It is preferred to commence the feed of initiator sometime—generally from about 1 to 15 minutes—before the feed of the monomers. Preference is given, further, to a process wherein the addition of initiator is commenced at the same time as the addition of the monomers and ended about half an hour after the addition of the monomers has ended. The initiator is preferably added in a constant amount per unit time. After the end of the addition of initiator, the reaction mixture is held at polymerization temperature for a time (generally from 1 to 6 hours) until all of the monomers used have undergone substantially complete reaction. "Substantially complete reaction" is intended to denote that preferably 100% by weight of the monomers used have reacted but that it is also possible for a small residual monomer content of not more than up to about 0.5% by weight, based on the weight of reaction mixture, to remain unreacted.

Suitable reactors for the copolymerization include the customary and known stirred tanks, stirred tank cascades, tube reactors, loop reactors or Taylor reactors, as described for example in the patent DE 1 071 241 B1, in the patent applications EP 0 498 583 A1 and DE 198 28 742 A1, or in the article by K. Kataoka in Chemical Engineering Science, volume 50, number 9, 1995, pages 1409 to 1416.

With regard to the molecular weight distribution there are no restrictions whatsoever imposed on the copolymer (A). Advantageously, however, the copolymerization is conducted so as to give a molecular weight distribution Mw/Mn, measured by gel permeation chromatography using polystyrene as standard, of $\leq 4$, preferably $\leq 3$, with particular preference $\leq 2$, and in particular $\leq 1.5$, and also, in certain cases, $\leq 1.3$. The molecular weights of the copolymers (A) are controllable within wide limits through the choice of the ratio:

"monomers (a)/monomer (b)/free-radical initiator".

In this relationship it is the amount of monomer (b) in particular that determines the molecular weight, the specific relationship being that, the larger the fraction of monomer (b), the lower the resulting molecular weight.

The copolymers (A) may be isolated prior to their reaction with the polyisocyanates (B). In terms of the process regime, however, it is of advantage to react the copolymers (A) in the organic solutions or aqueous dispersions, especially aqueous dispersions, in which they are obtained, to give the reaction products or polyurethanes (A/B).

The polyisocyanates (B) are preferably selected from the group consisting of acyclic aliphatic, cycloaliphatic, and aromatic diisocyanates, oligomers of these diisocyanates, and polyurethane prepolymers having terminal free isocyanate groups. In the cycloaliphatic diisocyanates, at least one isocyanate group is connected to a cycloaliphatic structural unit. In the aromatic diisocyanates, at least one isocyanate group is connected to an aromatic structural unit. In the acyclic aliphatic diisocyanates, both isocyanate groups are connected to an acyclic aliphatic structural unit.

Examples of suitable diisocyanates (B) are isophorone diisocyanate (i.e., 5-isocyanato-1-isocyanatomethyl-1,3,3, -trimethylcyclohexane), 5-isocyanato-1-(2-isocyanatoeth-1-yl)-1,3,3,-trimethylcyclohexane, 5-isocyanato-1-(3-isocyanatoprop-1-yl)-1,3,3,-trimethylcyclohexane, 5-isocyanato-(4-isocyanatobut-1-yl)-1,3,3,-trimethylcyclohexane, 1-isocyanato-2-(3isocyanatoprop-1-yl)cyclohexane, 1-isocyanato-2-(3isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as described in the patents DE 44 14 032 A1, GB 1 220 717 A1, DE-A-16 18 795, and DE 17 93 785 A1; tolylene diisocyanate, xylylene diisocyanate, bisphenylene diisocyanate, naphthylene diisocyanate or diphenylmethane diisocyanate.

Examples of suitable oligomeric polyisocyanates (B) are the oligomers of the above-described diisocyanates (B), containing, in particular, isocyanurate, biuret, allophanate, iminooxadiazinedione, urethane, urea, carbodiimide and uretdione groups.

Suitable polyurethane prepolymers (B) containing terminal free isocyanate groups are preparable by at least reacting at least one of the above-described diisocyanates (B) with at least one compound containing on average per molecule at least two, especially two, of the above-described isocyanate-reactive functional groups and at least one compound containing on average per molecule at least two, especially two, of the above-described isocyanate-reactive functional groups and at least one, especially one, of the above-described hydrophilic functional groups, the molar ratio of isocyanate groups to isocyanate-reactive functional groups being >1. It is preferred to employ hydroxyl groups as isocyanate-reactive functional groups.

Examples of suitable compounds containing on average per molecule at least two, especially two, of the above-described isocyanate-reactive functional groups are polyols, especially diols.

Examples of suitable polyols are saturated or olefinically unsaturated polyester polyols prepared by reacting
  unsulfonated or sulfonated, saturated and/or unsaturated
    polycarboxylic acids or their esterifiable derivatives,
    alone or together with monocarboxylic acids, and
  saturated and/or unsaturated polyols, alone or together
    with monools.

Examples of suitable polycarboxylic acids are aromatic, aliphatic, and cycloaliphatic polycarboxylic acids. It is preferred to use aromatic and/or aliphatic polycarboxylic acids.

Examples of suitable aromatic polycarboxylic acids are phthalic acid, isophthalic acid, terephthalic acid, phthalic, isophthalic, and terephthalic monosulfonates, and halophthalic acids, such as tetrachloro- and tetrabromophthalic acid, of which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid, and dodecanedicarboxylic acid, and maleic acid, fumaric acid, and itaconic acid, of which adipic acid, glutaric acid, azelaic acid, sebacic acid, dimer fatty acids, and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid, and 4-methyltetrahydrophthalic acid. These dicarboxylic acids may be used both in their cis and in their trans form, and also as a mixture of both forms.

Further examples of suitable polycarboxylic acids are polymeric fatty acids, especially those having a dimer content of more than 90% by weight, which are also referred to as dimer fatty acids.

Also suitable are the esterifiable derivatives of the abovementioned polycarboxylic acids, such as their single or multiple esters of aliphatic alcohols having from 1 to 4 carbon atoms, for example. It is also possible, moreover, to use the anhydrides of the abovementioned polycarboxylic acids, where they exist.

Together with the polycarboxylic acids it is also possible if desired to use monocarboxylic acids, such as benzoic acid, tert-butylbenzoic acid, lauric acid, isononanoic acid or fatty acids of naturally occurring oils, and also acrylic acid, methacrylic acid, ethacrylic acid or crotonic acid. Isononanoic acid is preferably used as monocarboxylic acid.

Examples of suitable low molecular mass polyols are diols and triols, especially diols. Usually, triols are used alongside the diols in minor amounts in order to introduce branching into the polyesterpolyols. In the context of the present invention, minor amounts mean amounts which do not bring about gelling of the polyesterpolyols during their preparation.

Examples of suitable low molecular mass diols are ethylene glycol, 1,2- and 1,3-propanediol, 1,2-, 1,3-, and 1,4-butanediol, 1,2-, 1,3-, 1,4-, and 1,5-pentanediol, 1,2-, 1,3-, 1,4-, 1,5-, and 1,6-hexanediol, neopentyl hydroxypivalate, neopentyl glycol, diethylene glycol, 1,2-, 1,3-, and 1,4-cyclohexanediol, 1,2-, 1,3-, and 1,4-cyclohexanedimethanol, trimethylpentanediol, ethylbutylpropanediol, the positionally isomeric diethyloctanediols, 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxymethylbicyclo[2.2.1]heptane, 2,2-diethylpropane-1,3-diol, 2,2-dipropylpropane-1,3-diol, 2-cyclohexyl-2-methylpropane-1,3-diol, 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-(2'-hydroxypropyl)benzene, and 1,3-(2'-hydroxypropyl)benzene.

Of these low molecular mass diols, 1,6-hexanediol and neopentyl glycol are particularly advantageous and are therefore used with particular preference.

The abovementioned low molecular mass diols may also be used as diols directly for the preparation of polyurethane prepolymers.

Examples of suitable low molecular mass triols are trimethylolethane, trimethylolpropane, and glycerol, especially trimethylolpropane.

The abovementioned low molecular mass triols may also be used as triols directly for the preparation of polyurethane prepolymers (cf. the patent EP 0 339 433 A1).

If desired, minor amounts of monools may also be used. Examples of suitable monools are alcohols and phenols, such as ethanol, propanol, n-butanol, sec-butanol, tert-butanol, amyl alcohols, hexanols, fatty alcohols, phenol, and allyl alcohol.

The polyesterpolyols may be prepared in the presence of small amounts of a suitable solvent as entrainer. Examples of entrainers used include aromatic hydrocarbons, such as, in particular, xylene and (cyclo)aliphatic hydrocarbons, e.g., cyclohexane or methylcyclohexane.

Further examples of suitable polyols are polyesterdiols obtained by reacting a lactone with a diol. They are notable for the presence of terminal hydroxyl groups and repeating polyester components of the formula —(—CO—$(CHR^5)_m$—$CH_2$—O—)—. In this formula the index m is preferably from 4 to 6 and the substituent $R^5$ is hydrogen or an alkyl, cycloalkyl or alkoxy radical. No one substituent contains more than 12 carbon atoms. The total number of carbon atoms in the substituent does not exceed 12 per lactone ring. Examples of such compounds are hydroxycaproic acid, hydroxybutyric acid, hydroxydecanoic acid, and hydroxystearic acid.

To prepare the polyesterdiols, preference is given to the unsubstituted epsilon-caprolactone, where m has the value 4 and all $R^5$ substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanolamines or else urea, with caprolactone. Further suitable higher molecular mass diols include polylactamdiols, which are prepared by reacting, for example, epsilon-caprolactam with low molecular mass diols.

Further examples of suitable polyols are polyetherpolyols, especially those having a number average molecular weight of from 400 to 5000, in particular from 400 to 3000. Examples of highly suitable polyetherdiols are polyetherdiols of the general formula H—(—O—$(CHR^6)_o$—$)_p$OH, where the substituent $R^6$ is hydrogen or a lower, substituted or unsubstituted alkyl radical, the index o is from 2 to 6, preferably 3 or 4, and the index p is from 2 to 100, preferably from 5 to 50. Especially suitable examples are linear or branched polyetherdiols such as poly(oxyethylene) glycols, poly(oxypropylene) glycols, and poly(oxybutylene) glycols.

By means of the polyetherdiols it is possible to introduce the nonionic hydrophilic functional groups (a13), or some of them, into the main chain(s) of the polyurethane prepolymers (B).

Examples of suitable compounds containing on average per molecule at least two, especially two, of the above-described isocyanate-reactive functional groups and at least one, especially one, of the above-described hydrophilic functional groups are 2,2-dimethylolethyl- or -propylamine blocked with a ketone, the resultant ketoxime group being hydrolyzed again before the cationic group (a11) is formed, or N,N-dimethyl-, N,N-diethyl- or N-methyl-N-ethyl-2,2-dimethylolethyl- or -propylamine;

dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, alpha, alpha-diaminovaleric acid, 3,4-diaminobenzoic acid, 2,4-diaminotoluenesulfonic acid, and 2,4-diaminodiphenyl ether sulfonic acid, and also the above-described polyetherpolyols.

Neutralizing agents which may be used are those described above.

It is also possible to use further starting compounds to prepare the polyurethane prepolymers (B), in order advantageously to vary the profile of properties of the modified copolymers of the invention.

Where the modified copolymers of the invention are to have self-crosslinking properties, it is possible to use at least one compound containing at least one blocked isocyanate group and at least two isocyanate-reactive functional groups. Examples of suitable isocyanate-reactive groups are those referred to above, of which the primary and secondary amino groups and the hydroxyl groups are of advantage and the hydroxyl groups are of particular advantage. Examples of suitable blocking agents are those known from the U.S. Pat. No. 4,444,954 A1, of which the oximes and ketoximes, especially the ketoximes, specifically methyl ethyl ketoxime, offer particular advantages and are therefore used with particular preference. Alternatively, the blocked isocyanate groups may result from the reaction of the free isocyanate groups of the polyurethane prepolymer with the blocking agents. After the reaction, however, there must still be free isocyanate groups for the reaction with the copolymers (A).

Viewed in terms of its method, the preparation of the isocyanato-functional polyurethane prepolymers (B) has no special features but may instead be effected as described in the patents EP 0 089 497 B1 and EP 0 228 003 B1, in bulk or in an inert organic medium, preferably in an inert organic medium, preference being given to the use of polar organic solvents, especially water-miscible solvents such as ketones, esters, ethers, cyclic amides or sulfoxides. In this context, the reaction may be carried out in a plurality of stages or in one stage. The key factor is that the reaction is carried out until the amount of free isocyanate groups is constant.

The reaction of the above-described copolymers (A) with the above-described polyisocyanates (B) likewise has no special features in terms of its method but instead takes place by mixing of the organic solutions or of the aqueous dispersions of the copolymers (A) with the polyisocyanates (B) or their solutions, preferably with their solutions, in appropriate reaction vessels, examples of which are those described above. The molar ratio of isocyanate-reactive groups in the copolymers (A) to the free isocyanate groups in the polyisocyanates (B) is preferably chosen so that following the reaction to give the polyurethane (A/B) there are no longer any free isocyanate groups present.

The polyurethanes (A/B) may be isolated from the organic solutions or aqueous dispersions in which they are produced, and transferred to other reaction media for copolymerization with the further olefinically unsaturated monomers (a). Preferably, the copolymerization is conducted in the organic solutions or aqueous dispersions, especially aqueous dispersions, in which the polyurethanes are produced.

Viewed in terms of its method, the copolymerization of the polyurethanes (A/B) with the further monomers (a) has no special features but instead takes place with the aid of the apparatus and processes described above in connection with the preparation of the copolymers (A). It is a substantial advantage of the process of the invention that this copolymerization can be carried out in the absence of the above-described free-radical initiators.

Suitable further monomers (a) are all of those described above. It is preferred to employ monomers (a2) and/or (a3). The hydrophilic or hydrophobic properties may also be purposively controlled through the use of monomers (a1).

The modified copolymers of the invention may be isolated from the organic solutions or aqueous dispersions in which they are produced, and passed on for a very wide variety of end uses, especially in solventborne, water- and solvent-free pulverulent solid, or water- and solvent-free liquid, coating materials, adhesives, and sealing compounds. They are especially suitable, for instance, for preparing pigmented or unpigmented, conventional or aqueous coating materials, powder coating materials, powder slurry coating materials, or 100% systems (water- and solvent-free liquid systems).

The organic solutions of the modified copolymers of the invention may also be dispersed in water to give secondary aqueous dispersions which can be used as, or to prepare, aqueous coating materials, adhesives, and sealing compounds.

In accordance with the invention it is of advantage to use the organic solutions or primary aqueous dispersions of the modified copolymers of the invention, especially aqueous dispersions, as or to prepare coating materials, adhesives, and sealing compounds.

In their use as coating materials, the modified copolymers of the invention exhibit outstanding film formation properties.

The coating materials, adhesives, and sealing compounds of the invention may be curable physically, thermally, or thermally and with actinic radiation.

In the context of the present invention, the term "physical curing" denotes the curing of a layer of a coating material, adhesive or sealing compound by filming as a result of loss of solvent from the coating material, adhesive or sealing compound, with linking within the coating, adhesive film or seal taking place by looping of the polymer molecules of the binders (regarding the term, cf. Römpp Lexikon Lacke und Druckfarben, Georg Thieme Verlag, Stuttgart, New York, 1998, "Binders", pages 73 and 74). Alternatively, filming takes place by coalescence of binder particles (cf. Römpp Lexikon Lacke und Druckfarben, Georg Thieme Verlag, Stuttgart, New York, 1998, "curing", pages 274 and 275). Normally, no crosslinking agents are required for this purpose. If desired, physical curing may be assisted by atmospheric oxygen, by heat or by exposure to actinic radiation.

In the context of the present invention, the term "self-crosslinking" refers to the capacity of a binder to enter into crosslinking reactions with itself. A prerequisite for this is that the binders already contain both types of complementary reactive functional groups that are necessary for crosslinking. Externally crosslinking, on the other hand, is the term used to refer to coating materials, adhesives, and sealing compounds in which one type of the complementary reactive functional groups is present in the binder and the other type in a curing or crosslinking agent. For further details, reference is made to Römpp Lexikon Lacke und Druckfarben, Georg Thieme Verlag, Stuttgart, New York, 1998, "curing", pages 274 to 276, especially page 275, bottom.

In the context of the present invention, actinic radiation is electromagnetic radiation, such as near infrared (NIR), visible light, UV radiation or X-rays, especially UV radiation, and corpuscular radiation such as electron beams. Where thermal and actinic curing are employed together, the terms used include "dual cure" and "dual-cure coating material", "dual-cure adhesive" or "dual-cure sealing compound".

Again, besides the modified copolymers of the invention, the adhesives of the invention may comprise further suitable, customary and known constituents in effective amounts. Examples of suitable constituents are the crosslinking agents and additives described below, provided they are suitable for the preparation of adhesives.

Again, besides the modified copolymers of the invention, the sealing compounds of the invention may comprise further suitable, customary and known constituents in effective amounts. Examples of suitable constituents are the crosslinking agents and additives described below, provided they are suitable for the preparation of sealing compounds.

The primary and secondary dispersions of the modified copolymers of the invention are especially suitable for preparing aqueous coating materials, especially aqueous surface coating materials. Examples of aqueous coating materials of the invention are primer-surfacers, solid-color topcoat materials, aqueous basecoat materials, and clearcoat materials. The primary dispersions and secondary dispersions of the invention exhibit very particular advantages when used to prepare clearcoat materials and aqueous basecoat materials.

The further key constituent of the aqueous basecoat material of the invention is at least one color and/or effect pigment, fluorescent pigment, electrically conductive pigment or magnetically shielding pigment, a metal powder and/or a dye. The pigments and dyes may comprise organic or inorganic compounds.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent and interference pigments, for example, platelet-shaped effect pigments based on iron oxide with a shade ranging from pink to brownish red, or liquid-crystalline effect pigments. For further details, reference is made to Römpp Lexikon Lacke und Druckfarben, Georg Thieme Verlag, 1998, page 176, "effect pigments", and pages 380 and 381, "metal oxidemica pigments" to "metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A, and U.S. Pat. No. 5,244,649 A.

Examples of suitable inorganic color pigments are white pigments such as titanium dioxide, zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red, or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, and aniline black.

For further details, reference is made to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379, "metal complex pigments".

Examples of fluorescent pigments (daylight fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys, such as aluminum, zinc, copper, bronze or brass.

Suitable organic dyes are lightfast organic dyes with little or no tendency to migrate from the coating material of the invention or the coatings produced from it. The migration tendency may be estimated by the skilled worker on the basis of his or her general knowledge in the art and/or determined with the aid of simple preliminary rangefinding experiments, as part of tinting tests, for example.

The aqueous basecoat material of the invention may further comprise organic and inorganic fillers.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, reference is made to Römpp Lexikon Lacke und Druckfarben, Georg Thieme Verlag, 1998, pages 250 ff., "fillers".

It is of advantage to use platelet-shaped inorganic fillers such as talc or mica and nonplatelet-shaped inorganic fillers such as chalk, dolomite, calcium sulfates, or barium sulfate, since by this means it is possible with great effect to adjust the viscosity and the rheology.

Examples of suitable transparent fillers are those based on silica, aluminum oxide or zirconium oxide, but especially nanoparticles on this basis. These transparent fillers may also be present in the clearcoat materials of the invention.

The clearcoat material or aqueous basecoat material of the invention curable thermally, or thermally and with actinic radiation, may comprise at least one crosslinking agent containing the complementary reactive functional groups needed for thermal crosslinking.

Examples of suitable crosslinking agents are amino resins, as described for example in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, New York, 1998, pages 242 ff., in the book "Paints, Coatings and Solvents", second, completely revised addition, edited by D. Stoye and W. Freitag, Wiley-VCH, Weinheim, New York, 1998, pages 80 ff., in the patents U.S. Pat. No. 4,710,542 A and EP 0 245 700 A1, and in the article by B. Singh and coworkers, "Carbamylmethylated Melamines, Novel Crosslinkers for the Coatings Industry" in Advanced Organic Coatings Science and Technology Series, 1991, Volume 13, pages 193 to 207; carboxyl-containing compounds or resins, as described for example in the patent DE 196 52 813 A1; compounds or resins containing epoxide groups, as described for example in the patents EP 0 299 420 A1, DE 22 14 650 B1, DE 27 49 576 B1, U.S. Pat. No. 4,091,048 A, and U.S. Pat. No. 3,781,379 A; blocked polyisocyanates, as described for example in the patents U.S. Pat. No. 4,444,954 A1, DE 196 17 086 A1, DE 196 31 269 A1, EP 0 004 571 A1, and EP 0 582 051 A1; and/or tris(alkoxycarbonylamino)triazines, as described in the patents U.S. Pat. No. 4,939,213 A, U.S. Pat. No. 5,084,541 A, U.S. Pat. No. 5,288,865 A, and EP 0 604 922 A.

The use of crosslinking agents may be omitted if the modified copolymers of the invention present in the clearcoat materials or aqueous basecoat materials of the invention have self-crosslinking properties or crosslink physically.

The dual-cure coating materials, especially the dual-cure clearcoat materials, comprise at least one constituent which is curable with actinic radiation. Examples of suitable radiation-curable constituents are (meth)acryloyl-functional (meth)acrylic copolymers, polyether acrylates, polyester acrylates, unsaturated polyesters, epoxy acrylates, urethane acrylates, amino acrylates, melamine acrylates, silicon acrylates, and the corresponding methacrylates. It is preferred to use radiation-curable constituents that are free from aromatic structural units. Particular preference is given to urethane (meth)acrylates and/or polyester (meth)acrylates, especially aliphatic urethane acrylates. Further examples of constituents curable with actinic radiation are described in the German patent application DE 198 35 206 A1.

In addition to the above-described constituents, the clearcoat material of the invention and the aqueous basecoat material of the invention may comprise customary and known binders, other than the modified copolymers of the invention, and/or additives, in effective amounts.

Examples of customary and known binders are oligomeric and polymeric, thermally curable, linear and/or branched and/or block, comb and/or random poly(meth)acrylates or acrylic copolymers, especially those described in patent DE 197 36 535 A1; polyesters; those described in the patents DE 40 09 858 A1 and DE 44 37 535 A1, alkyds, acrylated polyesters; polylactones; polycarbonates; polyethers; epoxy resin-amine adducts; (meth)acrylatediols; partially saponified polyvinyl esters; polyurethanes, including acrylate polyurethanes, especially those described in the patent applications EP 0 521 928 A1, EP 0 522 420 A1, EP 0 522 419 A1, EP 0 730 613 A1, and DE 44 37 535 A1; and polyureas.

Examples of suitable additives are thermally curable reactive diluents (cf. the German patent applications DE 198 09 643 A1, DE 198 40 605 A1, and DE 198 05 421 A1) or reactive diluents curable with actinic radiation (cf. Römpp Lexikon Lacke und Druckfarben, Stuttgart, New York, 1998, page 491), low-boiling organic solvents and/or high-boiling organic solvents ("long solvents"), UV absorbers, light stabilizers, free-radical scavengers, thermolabile free-radical initiators, photoinitiators, crosslinking catalysts, devolatilizers, slip additives, polymerization inhibitors, defoamers, emulsifiers, wetting agents, adhesion promoters, leveling agents, film forming auxiliaries, rheology control additives, and flame retardants. Further examples of suitable coatings additives are described in the textbook "Lackadditive" [Additives for coatings] by Johan Bieleman, Wiley-VCH, Weinheim, New York, 1998.

The preparation of the clearcoat material or aqueous basecoat material of the invention has no special features but instead takes place in a customary and known manner by mixing of the above-described constituents in appropriate mixing equipment such as stirred tanks, dissolvers, stirred mills, static mixers, toothed-wheel dispersers or extruders in accordance with the techniques suitable for preparing the respective coating materials.

Of course, the above-described pigments, fillers, crosslinking agents, and other additives, and the methods described above, may also be employed to prepare the adhesives and sealing compounds of the invention.

The coating materials, adhesives, and sealing compounds of the invention may be applied by customary and known methods to primed and unprimed substrates. The applied coating materials, adhesives, and sealing compounds may be cured simply, using the customary and known methods and apparatus.

The aqueous basecoat material of the invention and the clearcoat material of the invention—each individually in combination with customary and known aqueous basecoat materials or clearcoat materials, or in combination with one another—are outstandingly suitable for producing multicoat color and/or effect coating systems by the wet-on-wet technique, in which an aqueous basecoat film is applied, dried, and overcoated with a clearcoat film, after which aqueous basecoat film and clearcoat film are cured together. As is known, this technique is employed with advantage in the OEM finishing and refinishing of motor vehicles.

Furthermore, owing to their particularly advantageous properties, the coating materials of the invention may also be used to coat buildings inside and outside, to coat furniture, windows or doors, and for industrial coating, including coil coating, container coating, the impregnation or coating of electrical components, and the coating of white goods, including domestic appliances, heating tanks, and radiators.

The coatings of the invention exhibit very good adhesion to the substrates, very good intercoat adhesion, a particularly smooth, defect-free surface, an outstanding overall appearance, especially as regards color, effect, and gloss, high chemical resistance, weathering stability, acid stability, water resistance, and scratch resistance.

The adhesive films of the invention bond a wide variety of substrates fixedly and permanently to one another and have high chemical and mechanical stability even under extreme temperatures and/or temperature fluctuations.

Likewise, the seals of the invention seal the substrates permanently, possessing high chemical and mechanical stability even under extreme temperatures and/or temperature fluctuations and even in conjunction with exposure to aggressive chemicals.

Accordingly, the primed or unprimed substrates commonly employed in the technological fields indicated above, and coated with at least one coating of the invention, bonded with at least one adhesive film of the invention and/or sealed with at least one seal of the invention, combine a particularly advantageous profile of performance properties with a particularly long service life, so making them particularly attractive from an economic standpoint.

EXAMPLES

Preparation Example 1

The preparation of a Solvent-Free Methacrylate Copolymer (A1)

The methacrylate copolymer (A1) was prepared using a 4 liter stainless steel reactor equipped with stirrer, reflux condenser, two monomer feed ports and one initiator feed port. 50.98 parts by weight of deionized water were introduced, and this initial charge was heated to 90° C. with stirring. The feeds were commenced simultaneously. 9.88 parts by weight of acrylic acid, 17.82 parts by weight of methyl methacrylate, 1.45 parts by weight of diphenylethylene and 0.76 part by weight of mercaptoethanol were metered in at a uniform rate over the course of four hours from the first feed vessel. 9.64 parts by weight of a 25% strength ammonia solution were metered in at a uniform rate from the second feed vessel. The initiator feed, consisting of 5.1 parts by weight of deionized water and 4.37 parts by weight of ammonium peroxodisulfate, was metered in at a uniform rate over the course of 4.5 hours. After the end of the initiator feed, the reaction mixture was polymerized at 90° C. for three hours.

The resulting dispersion of the methacrylate copolymer (A) had a theoretical solids content of 36.7% by weight (measured: 34.9% by weight; one hour/130° C.).

Preparation Example 2

The Preparation of a Solvent-Free Methacrylate Copolymer (A2)

The methacrylate copolymer (A2) was prepared using a 4 liter stainless steel reactor equipped with stirrer, reflux condenser, two monomer feed ports and one initiator feed port. 52.53 parts by weight of deionized water were introduced, and this initial charge was heated to 90° C. with stirring. The feeds were commenced simultaneously. 10.18 parts by weight of acrylic acid, 17.04 parts by weight of methyl methacrylate, 1.5 parts by weight of diphenylethylene and 1.32 parts by weight of 2-hydroxyethyl methacrylate were metered in at a uniform rate over the course of four hours from the first feed vessel. 9.93 parts by weight of a 25% strength ammonia solution were metered in at a uniform rate from the second feed vessel. The initiator feed, consisting of 5.25 parts by weight of deionized water and 2.25 parts by weight of ammonium peroxodisulfate, was metered in at a uniform rate over the course of 4.5 hours. After the end of the initiator feed, the reaction mixture was polymerized at 90° C. for three hours.

The resulting dispersion of the methacrylate copolymer (A) had a theoretical solids content of 34.9% by weight (measured: 33.5% by weight; one hour/130° C.) and a hydroxyl number of 282 mg KOH/g.

Preparation Example 3

The preparation of a Polyurethane Prepolymer (B)

The polyurethane prepolymer was prepared using a 4 liter stainless steel reactor with stirrer and reflux condenser. 55.6 parts by weight of a polyesterdiol based on dimer fatty acids, terephthalic acid, and neopentyl glycol (solids content: 73% by weight), 0.58 part by weight of neopentyl glycol, 5.8 parts by weight of dimethylolpropionic acid and 23.02 parts by weight of tetramethylxylylidene diisocyanate (TMXDI®) and 15.0 parts by weight of methyl isobutyl ketone were weighed out and heated to 90° C. with stirring. When the amount of free isocyanate groups was constant, the reaction was terminated. The resulting polyurethane prepolymer (B) had a theoretical solids content of 70% by weight.

Example 1

The Preparation of an Inventive Modified Methacrylate Copolymer 1

The inventive modified methacrylate copolymer 1 was prepared in a 4 liter stainless steel reactor equipped with stirrer, reflux condenser, and three feed vessels.

36.31 parts by weight of the polyurethane prepolymer (B) from Preparation Example 3 were weighed out and heated to 82° C. with stirring. At this temperature, 1.37 parts by weight of triethylamine were metered in at a uniform rate over the course of 15 minutes. The resulting neutralized polyurethane prepolymer (B) was subsequently stirred for 30 minutes. Then 3.95 parts by weight of the aqueous dispersion of the methacrylate copolymer (A1) from Preparation Example 1 were added. The resulting mixture was stirred until free isocyanate groups were no longer detectable. Over the course of one hour, 37.92 parts by weight of deionized water were added to the reaction mixture at 82° C. The resulting dispersion was homogenized for one hour. Then 5.02 parts by weight of hydroxypropyl methacrylate, 1.43 parts by weight of n-butyl acrylate, 2.87 parts by weight of styrene, 2.87 parts by weight of tert-butylcyclohexyl acrylate and 2.15 parts by weight of methyl methacrylate were metered in at a uniform rate over the course of four hours. After the end of the addition, polymerization was continued for 5 hours. Thereafter, the dispersion of the inventive modified methacrylate copolymer 1 was adjusted to a solids content of 43% by weight using 6.11 parts by weight of deionized water. Based on the theoretical solids content, the dispersion 1 had an acid number of 43.3 mg KOH/g and a pH of 6.5.

The inventive dispersion 1 was outstandingly suitable for the preparation of coating materials, adhesives and sealing compounds, especially coating materials such as clearcoat materials and aqueous basecoat materials. Moreover, it was outstandingly suitable for the preparation of pigment pastes having a particularly high pigment/binder ratio.

Example 2

The Preparation of an Inventive Modified Methacrylate Copolymer 2

The inventive modified methacrylate copolymer 2 was prepared in a 4 liter stainless steel reactor equipped with stirrer, reflux condenser, and three feed vessels.

36.14 parts by weight of the polyurethane prepolymer (B) from Preparation Example 3 were weighed out and heated to 82° C. with stirring. At this temperature, 1.38 parts by weight of triethylamine were metered in at a uniform rate over the course of 15 minutes. The resulting neutralized polyurethane prepolymer (B) was subsequently stirred for 30 minutes. Then 3.344 parts by weight of the aqueous dispersion of the methacrylate copolymer (A2) from Preparation Example 2 were added. The resulting mixture was stirred until free isocyanate groups were no longer detectable. Over the course of one hour, 38.6 parts by weight of deionized water were added to the reaction mixture at 82° C. The resulting dispersion was homogenized for one hour. Then 5.0 parts by weight of hydroxypropyl methacrylate, 1.44 parts by weight of n-butyl acrylate, 2.88 parts by weight of styrene, 2.88 parts by weight of tert-butylcyclohexyl acrylate and 2.16 parts by weight of methyl methacrylate were metered in at a uniform rate over the course of four hours. After the end of the addition, polymerization was continued for 5 hours. Thereafter, the dispersion of the inventive modified methacrylate copolymer 2 was adjusted to a solids content of 43% by weight using 6.08 parts by weight of deionized water. Based on the theoretical solids content, the dispersion 2 had an acid number of 33 mg KOH/g and a pH of 6.8.

The inventive dispersion 2 was outstandingly suitable for the preparation of coating materials, adhesives and sealing compounds, especially coating materials such as clearcoat materials and aqueous basecoat materials. Moreover, it was outstandingly suitable for the preparation of pigment pastes having a particularly high pigment/binder ratio.

What is claimed is:

1. A polyurethane-modified addition copolymer prepared by free-radically (co)polymerizing at least one olefinically unsaturated monomer (a) in an aqueous or nonaqueous medium comprising the reaction product (A/B) of
   (A) at least one addition copolymer containing on avenge per molecule at least 0.1 isocyanate-reactive functional groups prepared by free-radical copolymerization in an aqueous medium or nonaqueous medium of at least
      a) at least one olefinically unsaturated monomer and b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$, and $R^4$ each independently of one another are hydrogen atoms or alkyl, cycloalkyl, alkylcyoloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are aryl, arylalkyl or arylcycloalkyl radicals; and (B) at least one polyisocyanate.

2. The copolymer as claimed in claim 1, wherein the copolymer (A) is a (meth)acrylate copolymer.

3. The copolymer as claimed in claim 1, wherein at least one of the monomers (a) which are copolymerized with monomers (b) is hydrophilic.

4. The copolymer as claimed in claim 1, wherein at least one of the monomers (a) which are (co)polymerized in the presence of at least one reaction product (A/B) is hydrophobic.

5. The copolymer as claimed in claim 1, wherein the monomers (a) which are polymerized in the presence of at least one reaction product (A/B) are (co)polymerized in the absence of a free-radical initiator.

6. The copolymer as claimed in claim 1, wherein the isocyanate-reactive functional groups are introduced into the copolymers (A) by a method selected from the group consisting of polymerizing at least one olefinically unsaturated monomer (a2) containing on average per molecule at least one isocyanate-reactive functional group, reacting at least one compound (c) which regulates the free-radical copolymerization and contains on average per molecule at least one thiol group and at least one further isocyanate-reactive functional group different than the thiol group, and a combination thereof.

7. The copolymer as claimed in claim 1, wherein the polyisocyanate or polyisocyanates (B) are selected from the group consisting of acyclic aliphatic, cycloaliphatic, and aromatic diisocyanates, oligomers of these diisocyanates, and polyurethane prepolymers containing terminal free isocyanate groups.

8. The copolymer as claimed in claim 7, wherein the oligomers of the diisocyanates (B) are selected from the group consisting of oligomers containing isocyanurate, biuret, allophanate, iminooxadiazinedione, urethane, urea, carbodiimide and uretdione groups.

9. The copolymer as claimed in claim 8, wherein the polyurethane prepolymers (B) are prepared by at least reacting at least one organic diisocyanate with at least one compound containing on average per molecule at least two isocyanate-reactive functional groups and at least one compound containing on average per molecule at least two isocyanate-reactive functional groups and at least one hydrophilic group, the molar ratio of isocyanate groups to isocyanate-reactive functional groups being >1.

10. The copolymer as claimed in claim 1, wherein the isocyanate-reactive functional groups are selected from the group consisting of thiol, hydroxyl, and primary and secondary amino groups.

11. The copolymer as claimed in claim 1, wherein the aryl radicals of the monomers (b) are phenyl or naphthyl radicals.

12. The copolymer as claimed in claim 11, wherein said aryl radicals are phenyl radicals.

13. The copolymer as claimed in claim 1, wherein at least one of the radicals $R^1$, $R^2$, $R^3$ and $R^4$ of the monomers (b) comprises a member selected from the group consisting of electron withdrawing atoms, electron donating atoms, and organic radicals.

14. The copolymer as claimed in claim 1, wherein at least one of the radicals $R^1$, $R^2$, $R^3$ and $R^4$ of the monomers (b) comprises a member selected from the group consisting of:
halogen atoms,
nitrile, nitro, partially and fully halogenated alkyl, cycloalkyl, alkylcycloalkyl,
cycloalkylalkyl, aryl, alkylaryl, cycloalkylaryl, arylalkyl, and arylcycloalkyl radicals,
aryloxy, alkyloxy, and cycloalkyloxy radicals,
acylthio, alkylthio, and cycloallcylthio radicals, and
primary, secondary and tertiary amino groups.

15. A process for preparing a polyurethane-modified addition copolymer as claimed in claim 1, which comprises (I) preparing in an aqueous or nonaqueous medium at least one addition copolymer (A) containing on average per molecule at least 0.1 isocyanate-reactive functional groups by free-radical copolymerization of at least
a) at least one olefinically unsaturated monomer and
b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$, and $R^4$ each independently of one another are hydrogen atoms or alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$, and $R^4$ are aryl, arylalkyl or arylcycloalkyl radicals;

(II) reacting the resulting copolymer (A) with at least one polyisocyanate (B) to give the polyurethane (A/B), and (III) (co)polymerizing at least one further olefinically unsaturated monomer (a) in the presence of the polyurethane (A/B).

16. A composition comprising a polyurethane-modified addition copolymer as claimed in claim 1, wherein said composition is a coating material, adhesive, or sealing compound.

17. The composition as claimed in claim 16, wherein the coating material, adhesive or sealing compound is curable physically, thermally, or thermally and with actinic radiation.

18. The composition as claimed in claim 17, wherein the coating material, adhesive or sealing compound curable thermally or thermally and with actinic radiation is a one-component or multicomponent system.

19. The composition as claimed in claim 16, wherein the coating material, adhesive or sealing compound is pigmented or unpigmented.

20. The composition as claimed in claim 16, wherein the coating material, adhesive or sealing compound is suitable for automotive OEM finishing and automotive refinish, coating buildings inside and outside, coating furniture, windows or doors, or for industrial coating, including coil coating, container coating, impregnating or coating electrical components, or the coating of white goods, including domestic appliances, boilers, and radiators.

21. A polyurethane-modified addition copolymer as claimed in claim 1, wherein at least two of the variables $R^1$, $R^2$, $R^3$, and $R^4$ are aryl radicals.

22. A process for preparing a polyurethane-modified addition copolymer as claimed in claim 15, wherein at least two of the variables $R^1$, $R^2$, $R^3$, and $R^4$ are aryl radicals.

23. A composition comprising a polyurethane-modified addition copolymer prepared by the process as claimed in claim 15, wherein said composition is a coating material, adhesives or sealing compound.

24. The composition as claimed in claim 23, wherein the coating material, adhesive or sealing compound is curable physically, thermally, or thermally and with actinic radiation.

25. The composition as claimed in claim 24, wherein the coating material, adhesive or sealing compound curable thermally or thermally and with actinic radiation is a one-component or multicomponent system.

26. The composition as claimed in claim 23, wherein the coating material, adhesive or sealing compound is pigmented or unpigmented.

27. The composition as claimed in claim 23, wherein the coating material, adhesive or sealing compound is suitable for automotive OEM finishing and automotive refinish, coating buildings inside and outside, coating furniture, windows or doors, or for industrial coating, including coil coating, container coating, impregnating or coating electrical components, or the coating of white goods, including domestic appliances, boilers, and radiators.

* * * * *